United States Patent [19]

Brock et al.

[11] Patent Number: 5,015,120
[45] Date of Patent: May 14, 1991

[54] METHODS AND APPARATUS FOR MAKING AN ASPHALT-AGGREGATE PAVEMENT

[75] Inventors: James D. Brock, Chattanooga, Tenn.; Donald W. Smith, Aurora; James H. Basset, Sycamore, both of Ill.; John P. Renneck, Chattanooga, Tenn.

[73] Assignee: Barber-Greene Company, DeKalb, Ill.

[21] Appl. No.: 309,079

[22] Filed: Feb. 10, 1989

Related U.S. Application Data

[63] Continuation-in-part of Ser. No. 89,318, Aug. 25, 1987, Pat. No. 4,818,139.

[51] Int. Cl.$^5$ .............................................. E01C 19/10
[52] U.S. Cl. ..................................... 404/108; 404/75; 414/518; 414/528
[58] Field of Search ............... 404/83, 91, 92, 95, 404/101, 102, 104-106, 108-111, 72, 75; 198/311, 550.2, 534; 414/518, 528

[56] References Cited

U.S. PATENT DOCUMENTS

| | | | |
|---|---|---|---|
| 3,719,298 | 3/1973 | Brown | 414/528 X |
| 3,810,537 | 5/1974 | Hungtington | 198/534 |
| 4,311,408 | 1/1982 | Wren | 404/104 |
| 4,317,642 | 3/1982 | Wirtgen | 404/72 |
| 4,322,178 | 3/1982 | Lee | 404/83 |
| 4,534,674 | 8/1985 | Cutler | 404/75 |
| 4,682,909 | 7/1987 | Mihara | 404/90 |
| 4,694,948 | 9/1987 | Ceylan | 198/550.2 X |
| 4,765,772 | 8/1988 | Benedetti et al. | 404/77 |
| 4,818,139 | 4/1989 | Brock et al. | 404/81 |

FOREIGN PATENT DOCUMENTS

| | | |
|---|---|---|
| 0132202 | 1/1985 | European Pat. Off. . |
| 0278679 | 8/1988 | European Pat. Off. . |
| 560594 | 10/1932 | Fed. Rep. of Germany . |
| 2628325 | 1/1978 | Fed. Rep. of Germany . |
| WO-A-0602963 | 5/1986 | PCT Int'l Appl. . |

OTHER PUBLICATIONS

Barber-Greene BG-750 Road Widener.
Barber-Greene, "Shuttle Buggy", Material Transfer Vehicle as described in U.S. Pat. No. 4,818,139.
Barber-Greene Company's Shuttle Buggy Material Transfer Vehicle with a Hydraulically Actuated Lip, Sep.-Oct., 1987.

*Primary Examiner*—Ramon S. Britts
*Assistant Examiner*—Matthew Smith
*Attorney, Agent, or Firm*—Jones, Day, Reavis & Pogue

[57] ABSTRACT

An apparatus and method for delivering asphalt-aggregate material from a plurality of supply trucks to a finishing machine. In a preferred form of the invention, the apparatus is a self-propelled storage vehicle including a hopper having a capacity substantially equal to the capacity of one of the supply trucks, a high capacity loading conveyor, and a high capacity unloading conveyor system. A tranversely disposed screw auger is provided for remixing the asphalt-aggregate material in the hopper prior to its discharge to the finishing machine. In the first method of operation the storage vehicle shuttles between the finishing machine and a remote location of the supply trucks and in the second method of operation the storage vehicle travels in tandem with the finishing machine as the paving operation is performed. The high capacity loading conveyor can be equipped with an extendable trough which has a pivotally attached trough floor with front and side plates. The extendable trough provides a large area which facilitates discharge of paving material from frameless trailers and allows for the early departure of the supply trucks from the conveyor. The final discharged paving material is gradually emptied from the extendable trough into the conveyor by hydraulic cylinders which tilt the trough to slide the material in the trough into the infeed end of the conveyor.

30 Claims, 7 Drawing Sheets

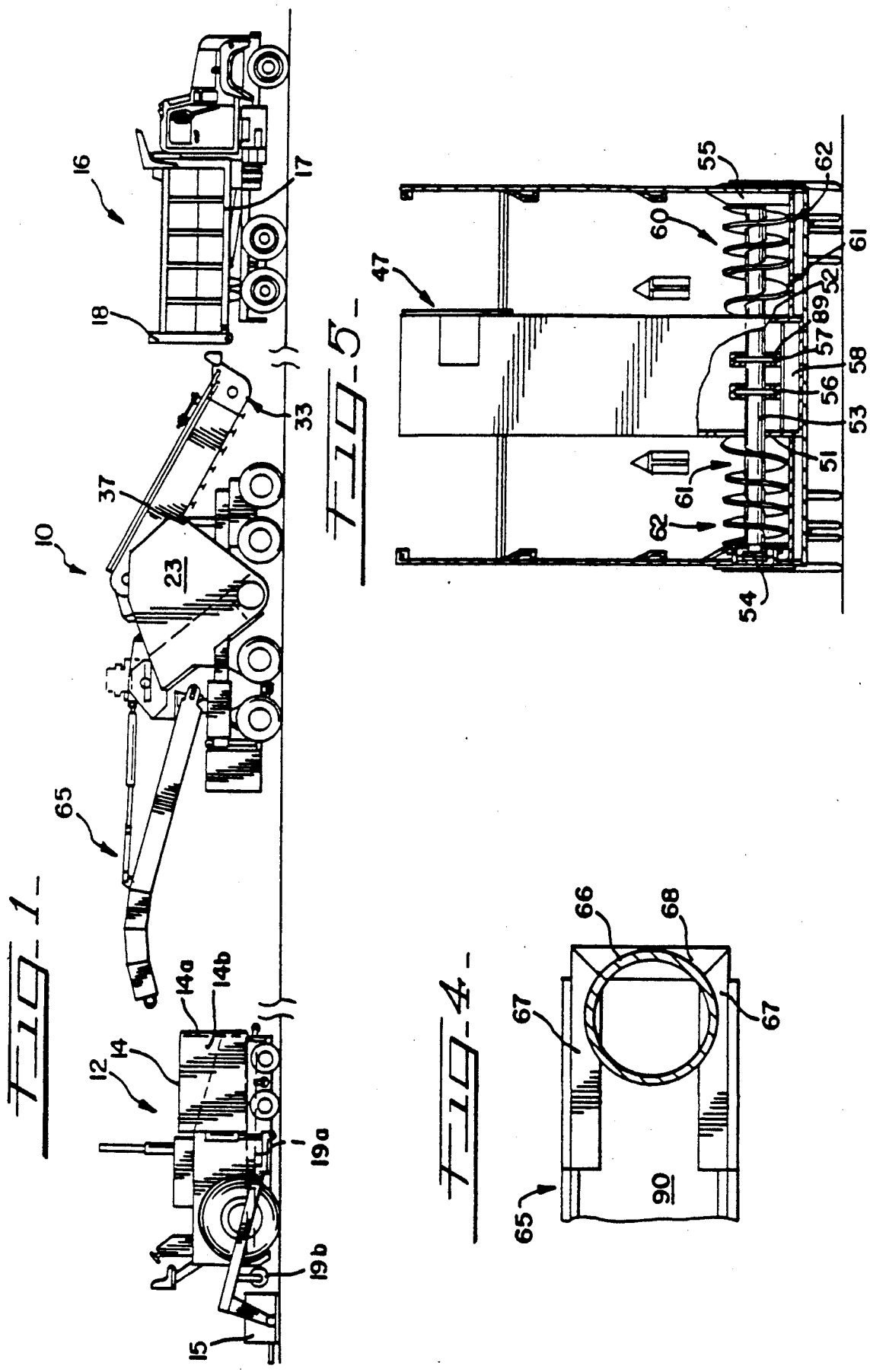

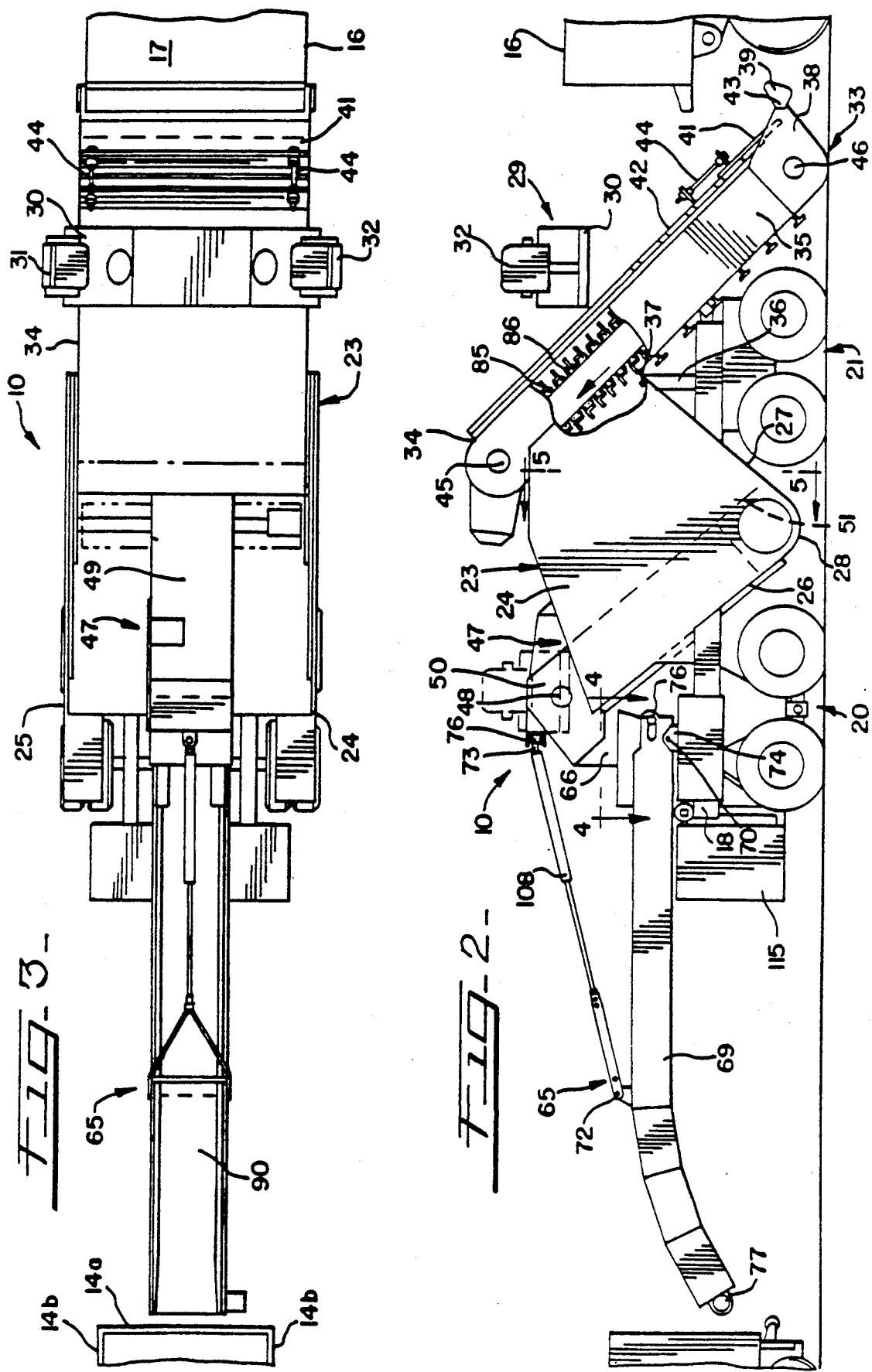

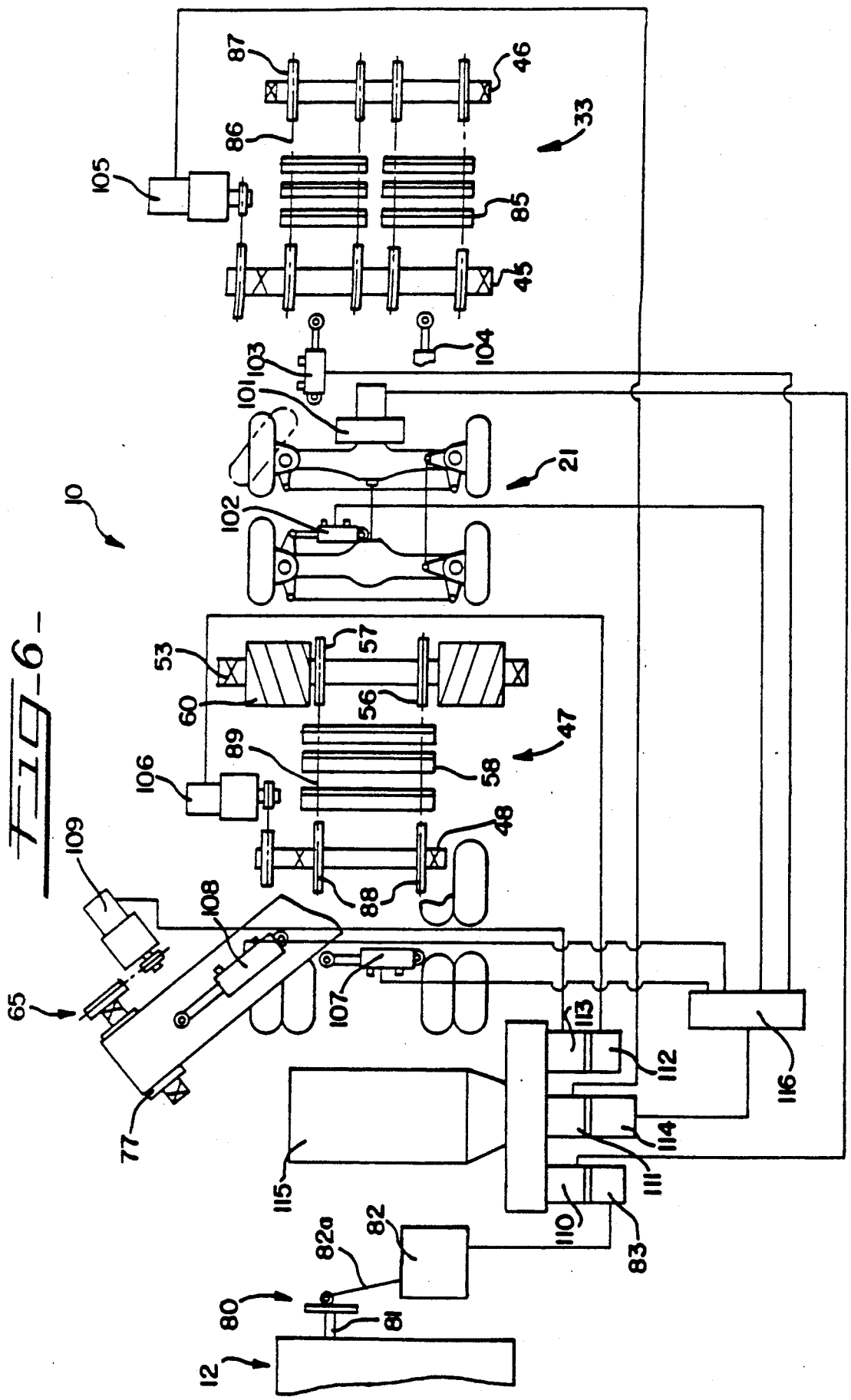

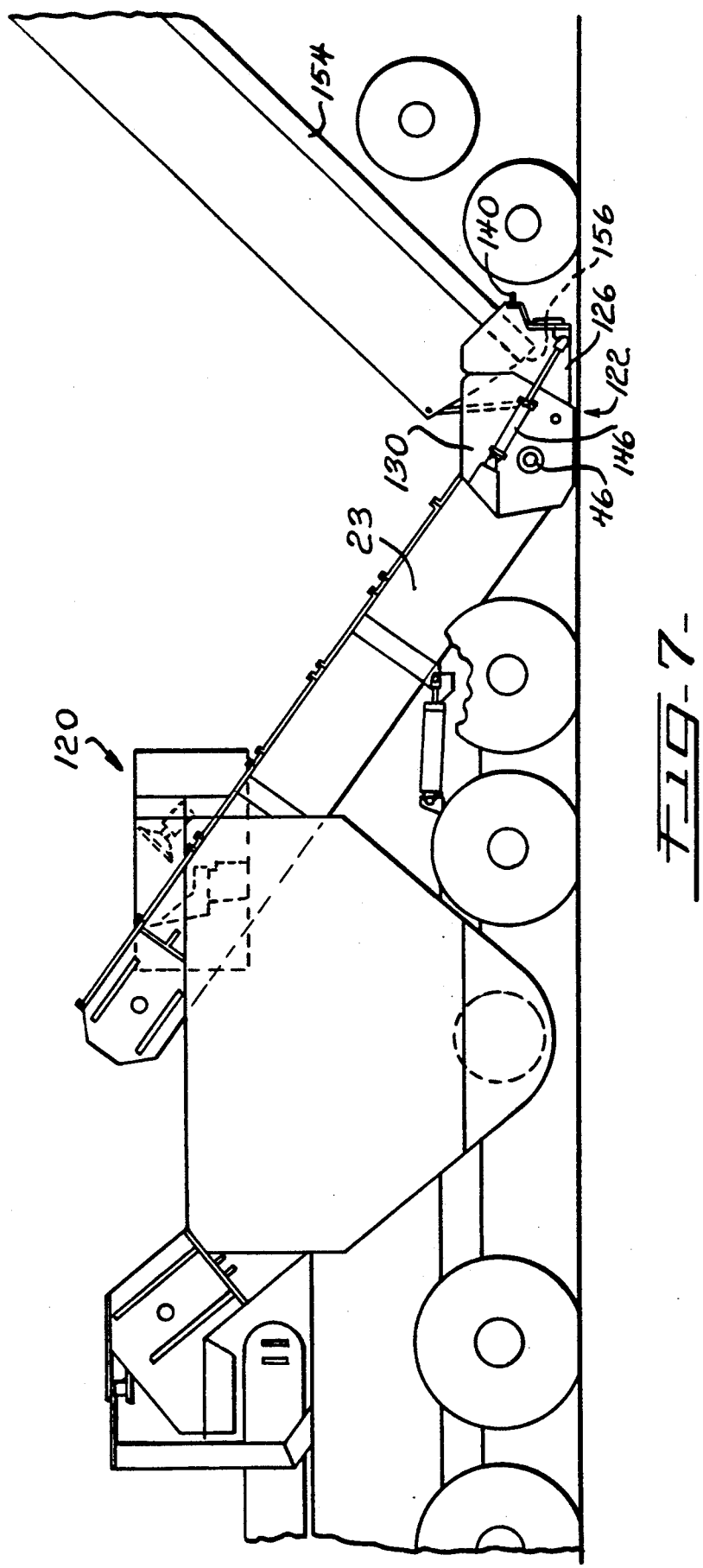

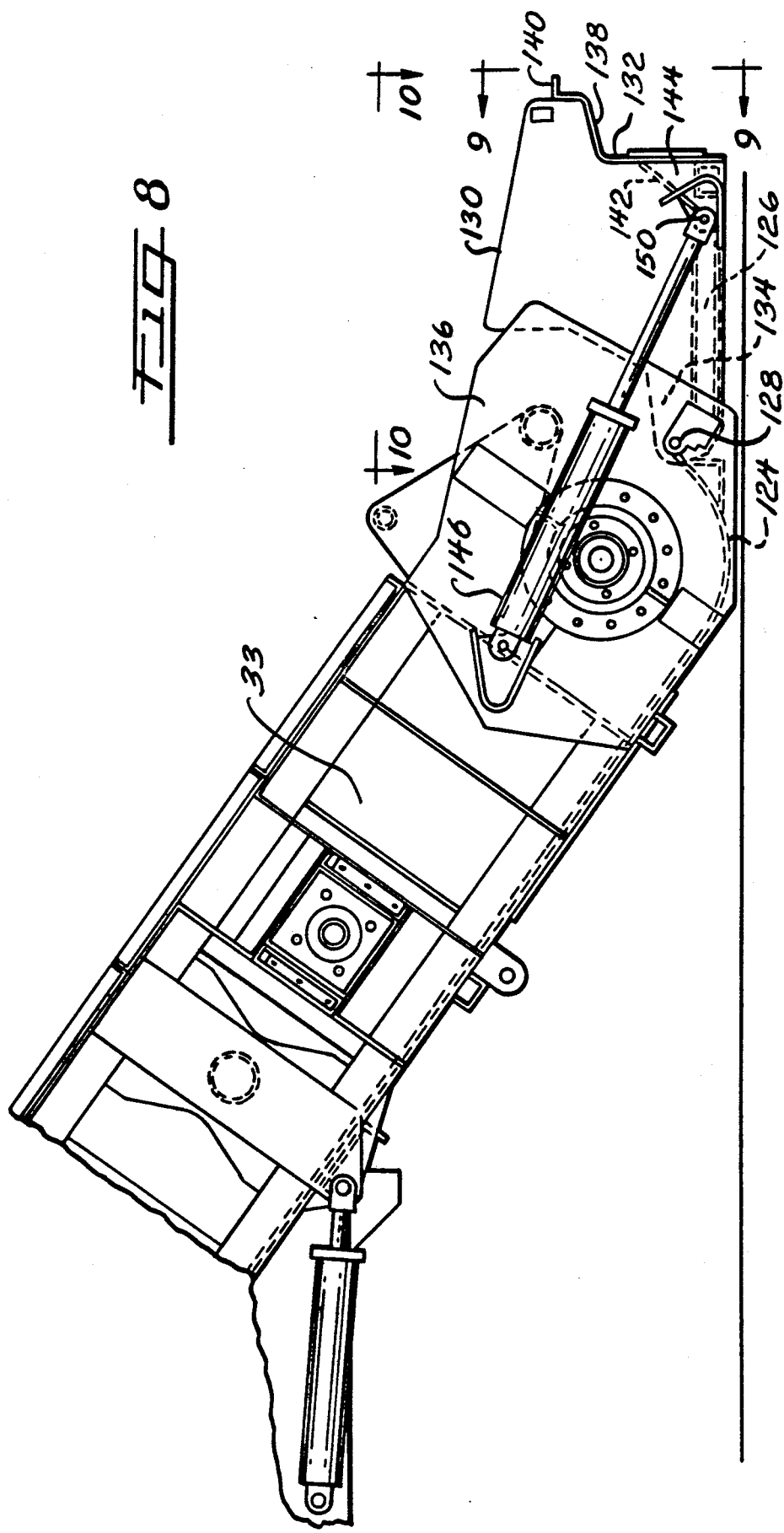

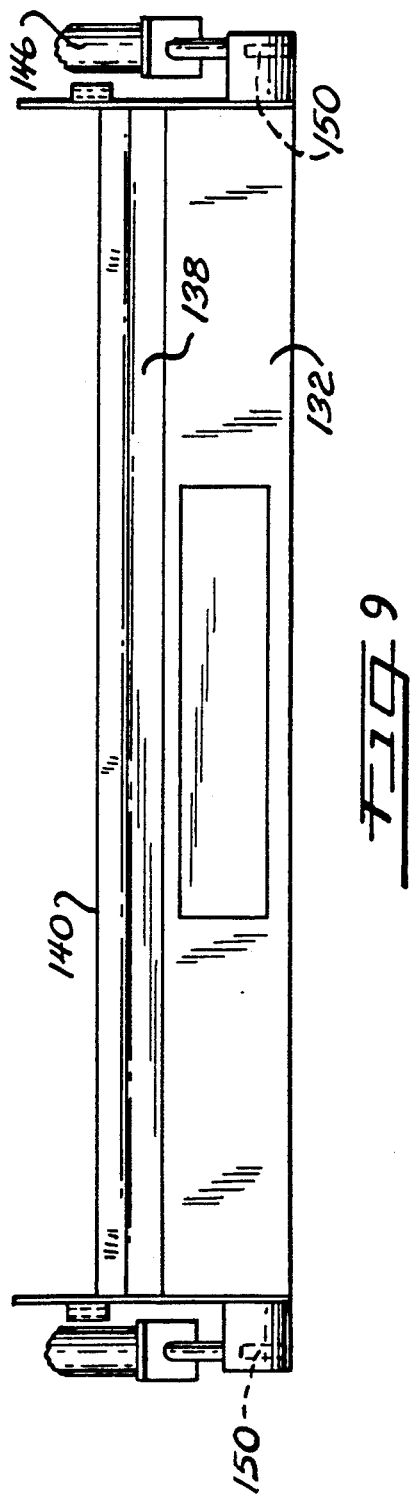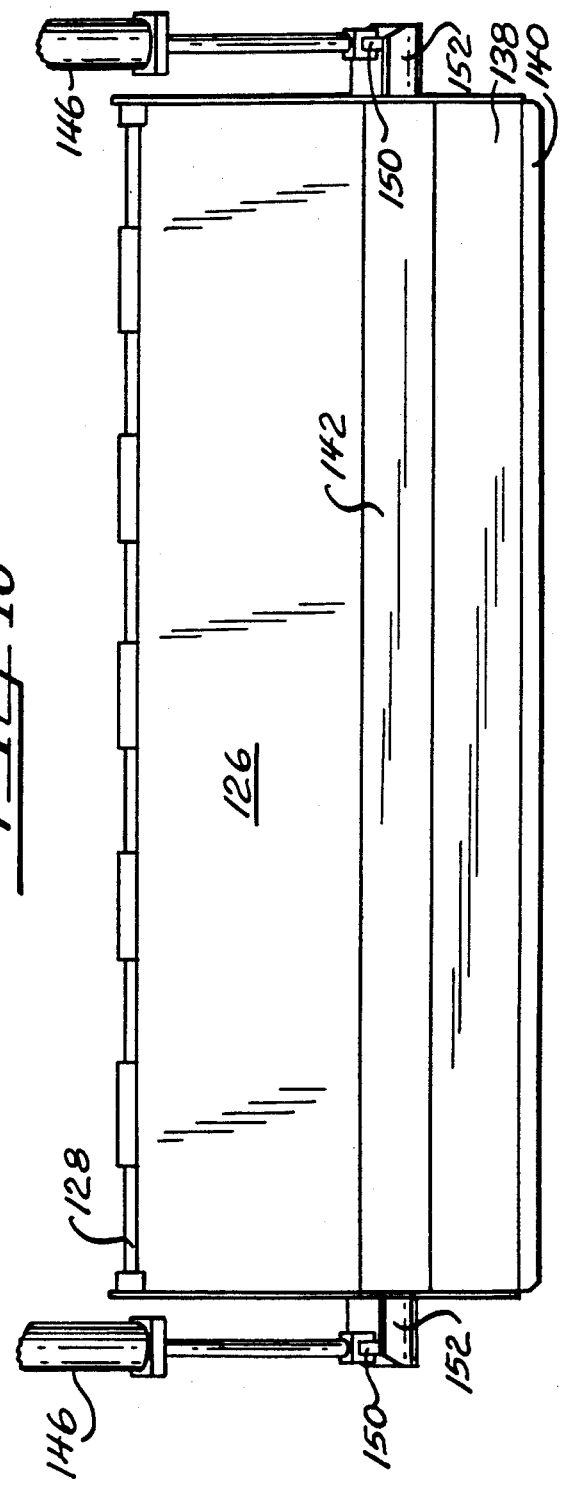

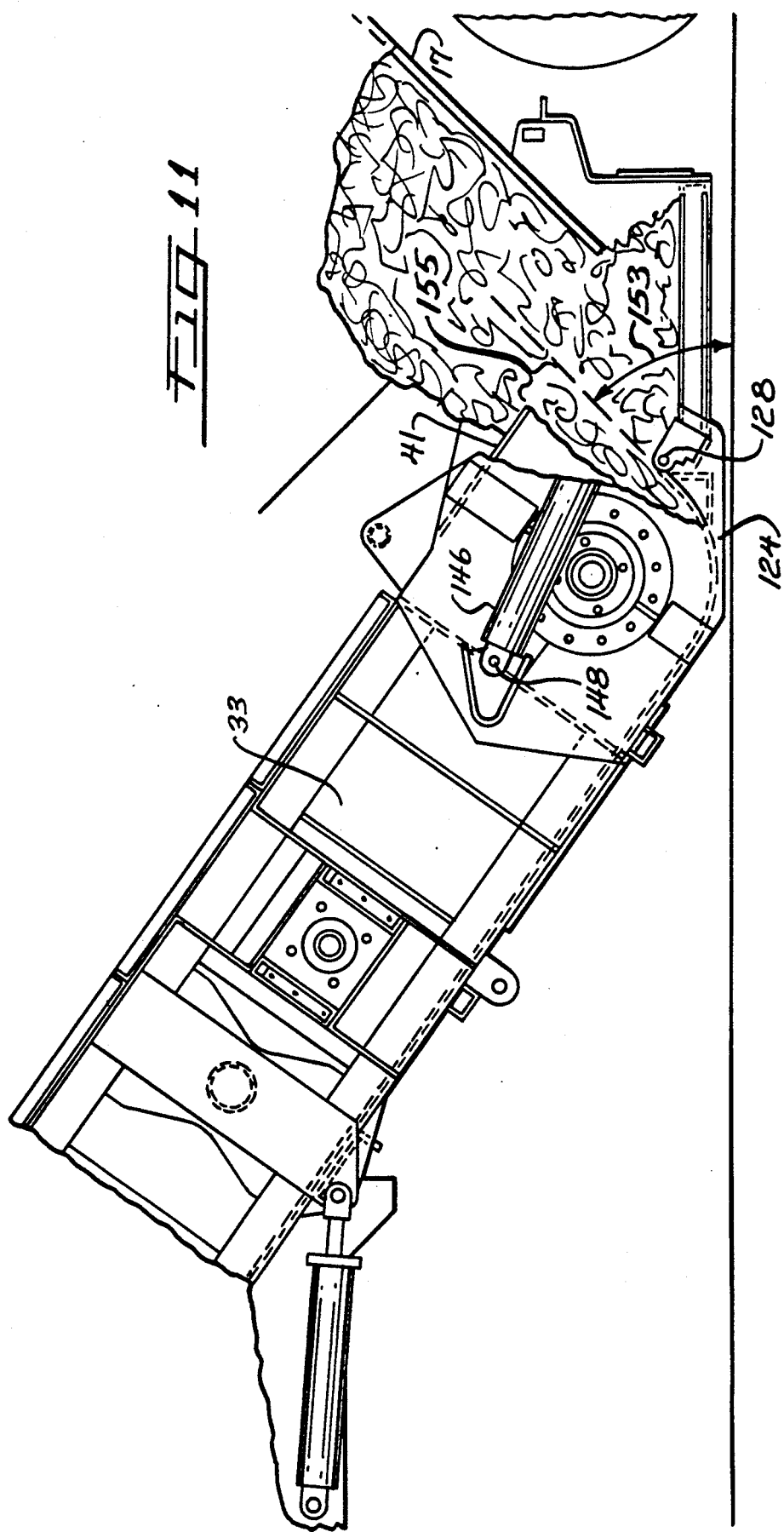

METHODS AND APPARATUS FOR MAKING AN ASPHALT-AGGREGATE PAVEMENT

This application is a continuation-in-part of patent application U.S. Ser. No. 89,318, filed Aug. 25, 1987, U.S. Pat. No. 4,818,139.

BACKGROUND OF THE INVENTION

1. Field of the Invention

The present invention relates in general to methods and apparatus for making an asphalt-aggregate pavement. In particular, the invention relates to methods and apparatus for transporting the asphalt-aggregate material from the delivery trucks to the screed of a finishing machine.

2. Summary Of The Prior Art

The conventional method of laying an asphalt-aggregate roadway mat includes the use of a finishing machine and a number of delivery trucks to transport the asphalt-aggregate material from the asphalt plant to the job site. Finishing machines of the type hereunder consideration, sometimes called pavers, are well-known to those skilled in the art. Such a finishing machine has a so-called floating screed at its rear end, usually provided with some form of vibratory means, to form the asphalt mat. The finishing machine also includes a hopper at its front end for receiving the asphalt-aggregate material and suitable conveyor means, usually slat conveyors and screw augers, for delivering the material from the hopper to a position just in advance of the screed.

A typical finishing machine has a hopper with a capacity of approximately 5 tons. A typical delivery truck, usually a dump truck, will have a capacity of approximately 20 tons. The technique for transferring the asphalt-aggregate material from the dump truck to the hopper of the finishing machine screed normally requires the truck driver to position his vehicle immediately in front of the finishing machine, the latter being provided with rollers which engage the rear tires of the truck. During the time that the material is being transferred from the dump truck to the hopper of the finishing machine, the latter is advancing along the subgrade as it forms the asphalt-aggregate mat and in doing so pushes the truck forwardly in tandem therewith.

A number of problems arise when operating the finishing machine and the delivery trucks in the manner just described. Quite frequently, the hopper of the finishing machine will be nearly empty and thus ready to be refilled, but a loaded dump truck will not be available at the job site. The absence of a loaded delivery truck at the required time is most often due to traffic conditions which prevent the delivery trucks from arriving at the job site at the proper time intervals. When this occurs, the finishing machine must obviously stop and await the arrival of another delivery truck.

As is known to those skilled in the art, when a finishing machine stops, even momentarily, the screed will tend to settle into the freshly laid mat. When the finishing machine then commences forward travel, the screed will tend to ride upwardly momentarily thus depositing an excessive amount of material. Consequently, the stopping of the finishing machine causes a depression and bump in the surface of the asphalt-aggregate mat resulting in an uneven pavement surface. Needless to say, it is desirable to produce the smoothest possible surface.

It is often necessary to stop the finishing machine even though one or more loaded delivery trucks are available at the job site. This is so since quite often it is simply impossible for the truck drivers to remove the empty delivery truck from the front of the finishing machine and to maneuver a full delivery truck into a position in advance of the finishing machine before the finishing machine runs out of material. As illustrated in Table I (set forth below), as the paving rate of the paver, in tons per hour (TPH), increases the available truck exchange time decreases.

TABLE I

TRUCK EXCHANGE TIME FOR A CONVENTIONAL FINISHING MACHINE OPERATING DISCONTINUOUSLY FINISHING MACHINE WITH 5 TON HOPPER CAPACITY OPERATES CONTINUOUSLY WITH 20 TON CAPACITY TRUCKS

| PAVING RATE (TPH) | 20 TON TRUCK INTERVAL (MINUTES) | TIME AT PAVER W/5 TON LIVE HOPPER | TRUCK EXCHANGE TIME AVAILABLE |
|---|---|---|---|
| 200 | 6 | 4.5 | 1.5 |
| 300 | 4 | 3.0 | 1.0 |
| 400 | 3 | 2.2 | 0.8 |
| 600 | 2 | 1.5 | 0.5 |

As is known to those skilled in the art, at least 1.5 minutes are required to perform the truck exchanging operation. Therefore, it is apparent from the data in Table I that a finishing machine using the conventional supply methods cannot operate continuously at a rate greater than 200 TPH. In order to operate at a higher paving rate and still provide sufficient time to exchange trucks, the paver must stop each time the hopper's supply of paving material is exhausted. This situation is illustrated in Table II (set forth below), where the finishing machine, running discontinuously, can operate at a rate of 800-1200 TPH while still providing the necessary 1.5 minutes for the truck exchanging operation.

TABLE II

TRUCK EXCHANGE TIME FOR A CONVENTIONAL FINISHING MACHINE OPERATING DISCONTINUOUSLY FINISHING MACHINE WITH 5 TON HOPPER CAPACITY OPERATES DISCONTINUOUSLY WITH 20 TON CAPACITY TRUCKS

| PAVER TPH | 20 TON TRUCK INTERVAL (MINUTES) | TIME AT PAVER | TRUCK EXCHANGE TIME AVAILABLE |
|---|---|---|---|
| 400 | 6.0 | 2.3 | 3.7 |
| 600 | 4.0 | 1.5 | 2.5 |
| 800 | 3.0 | 1.0 | 2.0 |
| 1200 | 2.0 | 0.8 | 1.2 |

However, this discontinuous operation of the finishing machine results in an undesirable depression and hump on the pavement mat each time the finishing machine is stopped to perform the truck exchanging operation, as previously explained.

There have been two general approaches in the prior art in an attempt to deal with the problems just mentioned. The first approach involves providing a delivery truck with a very substantial capacity. Representative prior art showing such trucks include U.S. Pat. Nos. 3,647,096; 3,731,825; 3,750,802; 3,794,194; and German Patent Publication 22 60 396 (1972), all in the name of John H. Holland. The provision of such large capacity trucks really does not solve the problem since the finishing machine still must be stopped if one of such trucks is not available in a loaded condition at the finishing machine hopper when its hopper is nearly empty. Further, the trucks shown in the aforesaid Holland patents are of the trailer-truck type making it even more difficult for the truck operator to maneuver the vehicle in advance of the finishing machine hopper.

Another approach, in an attempt to solve the finishing machine stopping problem referred to herein, involves dumping of the asphalt-aggregate material on the subgrade in the form of a windrow in advance of the path of travel of the finishing machine. According to this technique, a windrow loader machine, such as the machine shown in U.S. Pat. No. 3,693,512, is provided for picking up the material from the subgrade and for delivering the material into the hopper of the finishing machine.

This windrow approach has not proved to be very satisfactory. Although a delivery truck can normally dump its contents more rapidly in forming a windrow rather than remaining with the finishing machine when discharging the contents directly into the hopper of the latter, considerable skill is required on the part of the delivery truck driver to form a proper windrow. Accordingly, considerable time is still required to discharge the contents of the delivery truck. Thus, the delivery truck may be required to remain at the job site longer than desirable thereby delaying departure of the truck to the asphalt plant for picking up another load of the asphalt-aggregate material. Another disadvantage to the windrow technique results from the fact that the material is dumped onto the subgrade and hence some of the material picked up by the windrow loader may be contaminated with the subgrade material. Moreover, weather conditions can adversely affect the exposed asphalt material that forms the windrow.

SUMMARY AND OBJECTS OF THE INVENTION

The present invention resides in the provision of an apparatus that includes a large capacity hopper and a large capacity conveyor thereby permitting the delivery dump truck to discharge its entire contents directly into such hopper in a very rapid manner. In the preferred embodiment of the invention, the aforesaid apparatus is in the form of a self-propelled vehicle which may shuttle back and forth between the delivery trucks and the finishing machine. The present invention also resides in a method for using the apparatus of the present invention in association with delivery trucks and a modified form of the finishing machine. Further, the invention contemplates an expandable trough at the foot of the conveyor to facilitate transfer of paving material from the delivery truck into the conveyor.

A primary object of the present invention resides in the provision of a new apparatus and method for transferring asphalt-aggregate material from one or more delivery trucks to a finishing machine.

Another object of the present invention resides in the provision of, and the method of using, a self-propelled vehicle having a large capacity conveyor and hopper for shuttling back and forth between the delivery trucks and the finishing machine.

Still another object of the present invention is the provision of a self-propelled vehicle of the type described which includes a conveyor having an inlet with a width substantially the same as the width of the delivery truck thereby facilitating the rapid discharge of the contents of the delivery truck.

Another object of the present invention is the provision of a self-propelled vehicle of the type just described which is provided with a transversely disposed screw auger for remixing the asphalt-aggregate material in the hopper prior to transfer of the material to the hopper of the finishing machine.

Yet another object of the present invention is the provision of a self-propelled vehicle of the type described which is provided with a discharge conveyor, swingable in both vertical and horizontal planes, whereby the asphalt-aggregate material may be transferred from the self-propelled vehicle to the finishing machines when such vehicle is disposed on either side of the finishing machine.

Yet a further object of the present invention is the provision of an extendable trough at the foot of the conveyor to facilitate dumping of material from trucks into the conveyor.

These and other objects and advantages of the present invention will become apparent from the following description.

DESCRIPTION OF THE DRAWINGS

FIG. 1 is a schematic side elevation showing the preferred embodiment of the present invention, i.e., a self-propelled storage vehicle, in association with a finishing machine and a delivery truck;

FIG. 2 is an enlarged side elevation of the self-propelled storage vehicle;

FIG. 3 is a top plan view of the self-propelled storage vehicle;

FIG. 4 is a section taken along the line 4—4 of FIG. 2;

FIG. 5 is a section view taken along line 5—5 of FIG. 2 with a portion of the discharge conveyor housing cut-away to show a portion of the discharge conveyor;

FIG. 6 is a diagrammatic view showing the hydrostatic drive system for the self-propelled storage vehicle and the associated hydraulic systems for the various conveyors;

FIG. 7 is an enlarged side elevation view of the self-propelled storage vehicle equipped with an extendable conveyor trough;

FIG. 8 is a detailed side elevation view of the extendable conveyor trough;

FIG. 9 is a front elevation view of the extendable conveyor trough;

FIG. 10 is a top plan view of the extendable conveyor trough; and

FIG. 11 is a side elevational view of the extendable conveyor shown in use with an adjustable gate feature.

DESCRIPTION OF THE INVENTION

Referring to FIG. 1, a self-propelled storage vehicle, constituting a preferred form of the apparatus of the present invention, is generally designated 10. The self-propelled vehicle is shown in association with a finishing machine, generally designated 12, and a delivery truck, generally designated 16.

The delivery truck 16 is normally in the form of a dumptruck having a pivotably mounted bed 17 with a tailgate 18. The truck 16 transfers the aggregate-asphalt material from a remote source to the storage vehicle 10 as will be explained below.

The finishing machine may be supported either by endless tracks or by rubber tires and includes a hopper 14 and a vibratory screed 15 which is of the floating type well known to those skilled in the art. The finishing machine also includes a conventional conveyor system consisting of longitudinally disposed conveyors 19a (shown in broken lines) and transversely disposed screw augers 19b for delivering the asphalt-aggregate material from the hopper 14 to a position just in advance of the screed 15 where it is discharged onto the subgrade.

The hopper of a conventional finishing machine is open at its front and has low side walls to receive the material from the dump truck. By using the self propelled vehicle of the present invention, the hopper of the finishing machine may be modified so that its capacity is expanded from the standard 5 tons to 12 tons, or even as high as 20 tons. This modification can be made by providing a wall 14a at the front of the otherwise conventional hopper and by increasing the height of the side walls 14b, as shown in FIG. 1. Of course, the standard supply truck 16 cannot deliver the aggregate-asphalt material to the modified hopper 14 because the truck's bed 17 discharges at an elevation well below the height of wall 14a. However, the storage vehicle 10 of the present invention is able to discharge the aggregate-asphalt material into the upwardly expanded hopper 14 because the discharge conveyor can swing vertically to an adequate height, as will hereinafter be explained.

Referring more particularly to FIGS. 2, 3, and 6, the self-propelled storage vehicle 10 includes a chassis 18 that is supported on the roadway surface by first and second wheel sets 20 and 21, respectively. It will be understood that alternative roadway engaging means, such as endless tracks, could be used in place of the wheel sets 20 and 21.

As shown in FIG. 6, the hydrostatic drive system for the self-propelled storage vehicle 10 consists of individual hydraulic motors 101-109 that are supplied with fluid pressure from the hydraulic pumps 110-114. (It should be noted that the intake and exhaust lines for the hydraulic motors are represented by a single line in the drawings for improved clarity.) An engine 115 provides the motive force for the pumps as is conventional in hydraulic drive systems.

Wheel set 21 is driven by hydraulic motor 101 that is supplied with fluid pressure by propel pump 110. The wheel set 21 is also steerable by steer cylinder 102 which is supplied with fluid pressure from auxiliary pump 114 through manifold 116.

Referring more particularly to FIGS. 2 and 3, a large capacity storage hopper 23 is mounted on the chassis 18. The hopper 23 has a capacity approximately equal to the capacity of a single supply truck 16. The hopper, open at its top, consists of sidewalls 24, 25 and a bottom including a first inclined wall 26 joined with a second inclined wall 27 by an arcuate wall portion 28.

The self-propelled storage vehicle further includes an operator's platform 29 having a horizontally disposed frame 30 supporting identical operator control stations 31 and 32. The platform 29 is preferably mounted on the chassis 18 by means of a parallel linkage system (not shown) permitting the platform 29 to be swung back and forth over the hopper 23 (between the solid and broken line positions shown in FIG. 2) to facilitate operating the self-propelled vehicle in both directions. Of course, each operator control station includes the various controls for operating the hydraulic drive system of FIG. 6.

The storage vehicle 10 also includes a high capacity loading conveyor 33, preferably of the drag-slat type, comprising a frame 34 having side members 35 pivotably mounted to the uprights 36 of the chassis 18 by a horizontal shaft 37. Thus, conveyor 33 can be swung vertically about the horizontal shaft 37 between the loading position shown in FIG. 2 and the transport position shown in FIG. 1. The swinging movement of conveyor 33 is provided by a pair of hydraulic cylinders 103 and 104 supplied with fluid pressure by auxiliary pump 114 through manifold 116, as shown in FIG. 6.

The drag-slat conveyor 33 has slats 85 (FIGS. 2 and 6) mounted on endless chains 86 meshing with sprocket wheels 87 fixed to shafts 45 and 46. Shaft 45 is driven by hydraulic motor 105, as shown in FIG. 6, and is supplied with fluid pressure from a separate loading conveyor pump 111. The infeed end of conveyor 33 includes a trough 38 with a bumper 39 adapted to abut the back end of the supply truck 16 during the truck unloading operation. An important feature of the present invention is the provision of the trough 38 with a width substantially the same as the width of the supply truck bed 17 such that the asphalt-aggregate material can quickly and easily be dumped from the truck 16 into the trough 38.

An adjustable gate 41 is movably mounted over the infeed opening of the conveyor that is defined by the conveyor frame cover plate 42 and the lip 43 of the trough. The gate 41 is secured to the cover plate 42 by a pair of adjustable screw-thread assemblies 44 such that the size of the infeed opening can be varied to regulate the flow of material into the conveyor 33.

While adjustable gate 41, cover plate 42 and lip 43 of the trough are adequate for many types of dump trucks, for example the trucks shown in FIGS. 1 and 2 (a standard dump truck or standard trailer) it will not be adequate to receive material delivered in a frameless trailer. The standard dump truck and standard trailer pivot their bed about a point very near its back such that the lip of the bed is approximately two feet off the ground and easily slides material into the lip of the trough as shown in FIG. 2. However, a frameless trailer, which normally has a capacity of about 24–25 tons of material, is pivoted on its rear wheels about a point somewhere near the mid-point of the truck bed. Accordingly, the lip of the truck bed from which material is delivered can be as low as about 7–10 inches off the ground when tilted to deliver material. To accommodate the use of the frameless trailer and also to provide an enlarged trough hopper which can temporarily hold a significant volume of paving material, the conveyor can be provided with an extendable trough as shown in FIGS. 7-10.

The self-propelled vehicle equipped with the extendable conveyor trough is generally designated as 120. Conveyor 33 is now equipped with an extendable conveyor trough 122 at its infeed end. The extendable trough comprises a curved bottom plate 124 similar to that provided in trough 38, but which is pivotally attached to extendable trough floor 126 at pivot hinge 128. Extendable trough floor 126 has side plates 130 attached on either of its longitudinal ends, and a front trough wall 132. Side plates 130 are generally rectangular in shape but have extended portion 134 which extends about hinge 128 inside of fixed trough side plate 136. Extendable trough side plate 130 can slide relative to fixed trough side plate 136; however, the plates are adjacent one another such that material may not pass between the plates.

Front plate 132 has angled portion 138 which bends upward and terminates in lip 140. Inclined plate 142 runs between floor plate 126 and front plate 132 on the inside of the extendable trough between side plates 130. This inclined plate 142 encourages material towards the infeed end of the conveyor 33 and avoids wedging of paving material in the trough front corner 144.

The combination of trough floor 126, front wall 132, and side walls 130 define a trough or hopper which is capable of holding paving material. Preferably, this hopper is approximately the width of a dump truck or standard or frameless trailer. When it is this width, the trough will hold approximately one ton of paving material.

The extendable trough hopper is actuated by hydraulic cylinder 146 connected to the conveyor at hinge 148 and to the extendable trough at hinge 150. Hinge 150 is connected to the trough by bracket 152 which is welded at one end to the side plate 130. The bracket 152 has a projecting portion which is pivotally connected to the distal end of hydraulic cylinder 148.

When hydraulic cylinder 146 is contracted, the extendable trough is pivoted about hinge 128 to be in an upward position with trough floor 126 approximately vertical. Side plate walls 130 slide inside of fixed side walls 136 during this operation and any material in the extendable trough, resting on floor 126, is slid into the conveyor 33.

As shown in FIG. 7, a frameless trailer, schematically shown as 154, is tilted to dump its contents of paving material into the extendable trough. In this position the lower lip 156 of the bed of the frameless trailer 154 is below the trough lip 140 and between front wall 132 and conveyor 133. Accordingly, the contents of frameless trailer 154 are easily deposited in the extendable trough. As previously mentioned, in the preferred embodiment, approximately one ton of paving material can be contained in the trough as herein described.

Although the lowest edge 156 of the frameless trailer will be as low as seven inches from the ground when dumping paving material, the preferred embodiment of the present invention contemplates that the top of tough floor 126 will only be about five and three-quarters inches (5 ¾") from the ground (the conveyor itself being about one and one-half inches (1 ½") off the ground). Thus, the bed of a frameless trailer will be able to completely empty its bed into the trough without interference from either the front wall 132 or the floor 126 of the extendable trough.

While the trough is being filled, material is piled up to a level where it will be swept into conveyor 33 by slats 85 on endless chains 86, as shown in FIGS. 2 and 3. After the truck is emptied, it can depart from the conveyor leaving about one ton of material in the trough. After the material which naturally slides into the infeed of the conveyor is almost entirely fed in, the hydraulic cylinder 146 can be retracted to pivot the extendable trough upward and gradually introduce the remaining material into the conveyor 33. After the hydraulic cylinder is completed retracted, and all the material has been emptied into the infeed end of the conveyor, the hydraulic cylinder 146 is extended and the floor 126 pivoted down, parallel to the ground, returned to its empty state.

The adjustable gate 41 (shown in FIGS. 1-3 and described above) can be used in association with the extendable trough. Application of adjustable gate 41 with the extendable trough is shown in FIG. 11. It is desirable that the flow of paving material placed in the trough is restricted by the gate 41 to, at most, the rate at which the drag chain moves material to the chassis. Thus, jamming of the drag chain by the free flow of paving material in the trough is avoided.

The adjustable gate 41 can be used with the extendable trough to restrict material flow into the conveyor without extending more than a fraction of the distance across the trough. This is accomplished by taking advantage of the natural angle of repose (shown as 153 in FIG. 11) which is the angle at which material is stable within the trough. That is, the material within the angle of repose will not flow downward toward the conveyor inlet. Only material outside (or above) the angle will slide toward the inlet. Thus, the material within the angle of repose acts as a flow barrier on one side while the adjustable gate 41 restricts flow of material on the other side. Only material within the two barriers (shown as 155) will move toward the conveyor inlet.

The gate 41 can be adjusted to be closer or farther away from the material within the angle of repose in order to adjust the flow of material to be equal to (or less than) the capacity of the conveyor 33. Changes in the gate position are necessary to adjust for the different characteristics of the paving material being used in the particular application (which may change the angle of repose and/or the capacity of the conveyor) and for the operating speed of the conveyor.

After all the material in truck bed 17 is emptied, the material remaining in the trough and within the angle of repose is fed into the conveyor by actuating the extendable trough to slowly raise the trough floor 126. The material raised above the angle of repose 153 by the raising of the trough floor 126 will slide toward the conveyor inlet. As the floor 126 reaches (and surpasses) the angle of repose 153, all the material in the trough is fed into the conveyor 33. In the event the trough floor 126 is raised too quickly, the adjustable gate will restrict flow of paving material to at most the desired maximum flow (for which gate 41 has been set).

The use of the trough allows for a frameless trailer to deliver material which otherwise would not be able to completely empty its trailer into the trough as shown in FIG. 2. Further, for all trucks, even standard dumps and standard trailers, the extendable trough provides for increased storage capacity in the conveyor and allows the trucks to deposit their last one ton of paving material and depart the conveyor for re-loading or other jobs. Also, due to the height of front wall 132 and the length of floor 126 extending under the lip of the truck or trailer, less material is scattered on the ground when the truck lowers its bed at the time of departing the conveyor. Further, paving material is less likely to be spilled during its delivery to the trough and upon departure of the delivery truck.

The bottom wall of conveyor 33 terminates at a position just inside of the bottom wall 27 of the hopper such that the aggregate-asphalt material will fall into the hopper as the slats of the conveyor push the material past this position, as shown in the cut-away section of FIG. 2. Mounted on the inside surface of the hopper bottom wall 26 is a first discharge conveyor 47, as shown in FIGS. 2, 3, 5 and 6, which is preferably of the drag-slat type. The discharge conveyor 47 includes a first set of sprocket wheels 88 fixed to shaft 48. Hydraulic motor 106 drives shaft 48 and is provided with fluid pressure by a separate discharge pump 112.

A housing, consisting of a top wall 49 and a pair of opposed sidewalls 50, completely encloses the conveyor 47 except for openings 51 and 52 (FIG. 5) located in the sidewalls 50 in the area of arcuate wall portion 28. The second shaft 53 (FIG. 6) of the conveyor 47 extends through openings 51 and 52 and is journaled in suitable bearing assemblies 54 and 55, as shown in FIG. 5. Sprocket wheels 56 and 57 are fixed to shaft 53 and mesh with chains 89 that, in turn, support the slats 58.

The second shaft 53 of the conveyor 47 also functions as the shaft for the screw auger 60 that is disposed in the area of the hopper 23 defined by the arcuate wall portion 28 as shown in FIGS. 2, 3, and 5. Because the sprocket wheels 56 and 57 are fixed to the shaft 53, the hydraulic motor 106 also serves to rotate the screw auger 60. The rotation of the screw auger 60, in turn, conveys the aggregate-asphalt material from the lateral sides of the hopper, through the openings 51 and 52 and into the path of the first discharge conveyor 47. As the screw auger 60 rotates, it not only transports the material to conveyor 47 but also remixes the material such that a more uniform mixture of material is delivered to the finishing machine 12.

This mixing action of the screw auger 60 is especially important because the aggregate-asphalt material has a tendency to separate according to particle size during transportation and handling. As is known to those skilled in the art, when the asphalt-aggregate material is discharged from the surge bin at the asphalt plant into the bed of the delivery truck 16, the coarser material tends to flow toward the sides of the bed of the delivery truck. Thus, this coarser material will be transported to the sides or lateral extremities of the hopper 23 since the conveyor 33 transports the material from the bed of the delivery truck to the hopper 23 without imparting transverse or lateral movement to the asphalt-aggregate material to any significant degree. Consequently, it is desirable to remix the material in the hopper 23 by imparting the requisite lateral or transverse movement of the material from the side portions to the central portion of the hopper.

To this end, the screw auger 60 is designed such that each end of the shaft 53 is provided with first flight sections 61 joining with second flight sections 62. The pitch of the first flight sections 61 is greater than the pitch of the second flight sections 62. Thus, the volumes bounded by the flights of the first flight section 61 are greater than the volumes bounded by the flights of the second flight sections 62. As a result, when the coarse material, located at the lateral edges of the hopper, is conveyed from the second flight section 62 to the first flight section 61, it will not completely fill the larger volumes, thereby allowing the finer material, located in the central portion of the hopper, to enter the void spaces in these larger volumes and combine with the coarser material. This mixture of coarse and fine material is then conveyed to discharge conveyor 47. Thus, the variance in pitch between the flight sections 61 and 62 enhances the mixing capabilities of the screw auger 60.

A second discharge conveyor 65 is mounted on the chassis 18 such that the infeed end of conveyor 65 is located beneath the outfeed end of the first discharge conveyor 47. Material discharged from the first discharge conveyor 47 at the top edge of bottom wall 26 falls through the chute 66 onto the second discharge conveyor 65 as shown in FIGS. 2, 3, and 4. The infeed end of the frame 69 of the second discharge conveyor 65 is formed with guides 67 and 68 facilitating the flow of material from the chute 66 onto the conveyor 65. Preferably, the second discharge conveyor 65 is of the belt-type having end rollers 76, 77, and an endless belt 90. Roller 77 is driven by hydraulic motor 109 supplied with fluid pressure from pump 113 as shown in FIG. 6. It should be noted that a drag slat conveyor of the type already described may also be used.

The frame 69 is mounted for vertical swinging movement about shaft 70 and is raised and lowered by the lift cylinder 108 extending between a first pivot point 72 located on the conveyor frame 69 and a second pivot point 73 located on a rotatable sleeve 76 supported by the chassis 18. The trunnion 74 supports shaft 70 and is mounted on a turntable supported by a suitable bearing assembly (not shown) and rotated by hydraulic cylinder 107, as shown in FIGS. 2 and 6, such that the discharge end of conveyor 65 may be swung beyond the lateral extremities of the storage vehicle 10. Both the vertical lift cylinder 108 and the horizontal swing cylinder 107 are provided with fluid pressure from the auxiliary pump 114 through the manifold 116.

The self-propelled storage vehicle 10 of this invention is able to operate in either one of two alternate modes. In the first mode of operation, illustrated in FIG. 1, the storage vehicle 10 shuttles between a remote location of the supply trucks 16 and the job site where the finishing machine 12 is performing the paving operation. The finishing machine 12, having the modified hopper 14 with the expanded capacity of approximately 12-20 tons, begins the paving operation with the hopper filled with aggregate-asphalt paving material.

As the finishing machine 12 performs the paving operation, the storage vehicle 10 travels to the remote location of the supply trucks 16 where its loading conveyor 33 is positioned adjacent the rear of one of the trucks. The paving material is dumped from the truck 16 into the trough 38 where the loading conveyor 33, operating at a capacity of 800-1200 tons per hour (TPH), completely transfers the 20 tons of paving material from the truck 16 to the hopper 23 in approximately one minute. Of course, the material in the truck also could be dumped into an extendable trough, if the conveyor was so equipped, such as that shown in FIGS. 7-10.

The storage vehicle 10, with a full load of paving material in hopper 23, then travels to a position adjacent the finishing machine such that the output end of the second discharge conveyor 65 is disposed over the finishing machine's expanded hopper 14. In the time required for the storage vehicle 10 to travel to the supply truck 16, transfer the paving material from the truck 16 to the hopper 23, and return to the finishing machine, the supply of paving material in the finishing machine's hopper will have been nearly exhausted. Because it is desirable to have the finishing machine travel continuously, the storage vehicle operator controls the propel motor 101 so that the output end of conveyor 65 remains over the hopper 14 of the moving paving machine 12. As the two machines travel in tandem down the roadway, the auger 60, first discharge conveyor 47, and second discharge conveyor 65 are operated at a high capacity rate of 500-1200 TPH such that the 20 tons of paving material are completely transferred from the storage vehicle 10 to the finishing machine hopper 14 in approximately one minute. Thus, the finishing machine may run continuously while the storage vehicle 10 repeats this shuttle loading operation.

In the second mode of operation, the self-propelled storage vehicle 10 always travels adjacent the finishing machine 12, rather than shuttling between the remote location of the supply trucks and the finishing machine as in the first mode of operation. To coordinate the relative speeds of the two vehicles as they travel together down the roadway surface, a control linkage 80 is used between the finishing machine 12 and storage vehicle 10 as shown in FIG. 6. The control linkage 80 consists of a rigid finger 81 fixed to and extending from the front end of the finishing machine 12. This finger contacts a movable lever 82a of sensor 82 located on the storage vehicle 10. The sensor 82 is operatively connected to an output control 83 of the pump 110 such that the speed of the storage vehicle 10 is controlled to maintain a constant pressure on the sensor lever 82a by the finger 81. Thus, the speeds of the two vehicles, and consequently, the distance between the two vehicles are maintained constant as they travel down the roadway. It will be understood that the control linkage 80 could be eliminated and the motor 110 controlled by an operator to maintain the speed of the vehicle 10 substantially the same as the finishing machine.

Continuing with a description of the second mode of operation, the paving operation begins with the storage machine hopper 23 and the finishing machine hopper 14 fully loaded with paving material. As the paving operation progresses, the storage vehicle 10 begins to transfer the paving material from its hopper 23 to the finishing machine hopper 14 while the two vehicles travel along the roadway together. However, unlike the first mode of operation, the paving material is discharged at a rate approximately equal to the paving rate of the finishing machine. Thus, a steady-state flow of material occurs between the storage vehicle 10 and finishing machine 12. Because the paving material of the storage vehicle 10 is slowly discharged onto the finishing machine hopper, it is not necessary to use a modified finishing machine with the expanded hopper 14. Thus, a conventional finishing machine may be used. However, it is preferable to use the expanded hopper 14 because the greater the combined storage capacity of the storage vehicle 10 and the finishing machine 12, the fewer trucks needed to maintain the storage vehicle 10 loaded, which, of course, translates into a cost reduction for the paving operation.

During this gradual discharging of the paving material from the storage vehicle hopper 23, a supply truck is backed into abutting engagement with the bumper 39 of the storage vehicle 10 and is pushed along therewith. Thus, when the supply of paving material in the hopper 23 has been nearly depleted, the paving material in the supply truck, that has already been positioned at the trough 38, can be quickly transferred to the hopper 23 by the high capacity loading conveyor 33 operating at a capacity of 900-1200 TPH. This process is repeated continuously such that a constant supply of paving material is made available to the finishing machine. Again, transfer of material from the supply truck to the vehicle hopper 23 also could be accomplished by use of the extendable trough of FIGS. 7-10.

In either the first or second mode of operation, the vertical and horizontal swinging of the second discharge conveyor 65 allows the storage vehicle 10 to feed the finishing machine hopper 14 even when the two machines are riding on surfaces having different elevations or when the machines are traveling offline or side by side. The horizontal swinging movement of conveyor 65 also facilitates the feeding of the material when the vehicles are rounding corners.

The paving method and apparatus of this invention provide a more efficient loading capability for the finishing machine that results in a higher quality paved surface. As illustrated in Table III (set forth below), the storage vehicle and finishing machine, when used in the first mode of operation, can pave continuously at a rate of 500 TPH while still allowing a 1.5 minute truck exchange time.

TABLE III

TRUCK EXCHANGE TIME USING A STORAGE VEHICLE ACCORDING TO THE INVENTION FINISHING MACHINE WITH 20 TON CAPACITY HOPPER OPERATES CONTINUOUSLY WITH 20 TON TRUCKS ACCORDING TO THE FIRST MODE OF OPERATION OF THE INVENTION

| PAVER TPH | 20 TON TRUCK INTERVAL (MINUTES) | TIME AT PAVER @ (1200 TPH) (MINUTES) | TRUCK EXCHANGE TIME |
|---|---|---|---|
| 200 | 6 | 1 | 5 |
| 300 | 4 | 1 | 3 |
| 400 | 3 | 1 | 2 |
| 500 | 2¼ | 1 | 1¼ |
| 600 | 1 | 1 | 1 |

This is a 300 TPH increase over the prior art system referred to in Table I. Moreover, in the second mode of operation, where the supply of paving material from the storage machine is continuous, the paving rate of the system is increased such that it is substantially equal to the maximum paving rate of the finishing machine. In either mode of operation, the paving operation runs continuously to provide a higher quality paved surface having no undesirable depressions or lumps.

Although the invention has been described in its preferred forms with a certain degree of particularity, it is to be understood that the present disclosure has been made by way of example only. Numerous changes in the details and construction of the combination and arrangement of Parts will be apparent without departing from the spirit and scope of the invention, as defined in the appended claims.

WHAT IS CLAIMED IS

1. An apparatus capable of receiving material from a delivery truck, the apparatus comprising:
   chassis means capable of receiving material;
   inclined conveyor means mounted on the chassis means, the conveyor means having a discharge portion for discharging material into the chassis means and an inlet leading into the conveyor means; and
   a trough extending from the inlet to receive material from the delivery truck;
   wherein the trough is capable of having its volume decreased after receiving the material to move material in the truck dump hopper into the inlet.

2. The apparatus of claim 1 wherein the trough comprises a floor which has two longitudinal edges and two side edges, the floor being pivotally connected at one longitudinal edge to the inlet and at the other longitudinal edge to a front wall, the trough also having two side walls communicating between the side edges of the floor and the front wall.

3. The apparatus of claim 2 further comprising lifting means connected between the conveyor means and a trough to pivot the trough about its pivotal connection to the inlet.

4. The apparatus of claim 3 wherein the lifting means is a hydraulic cylinder.

5. The apparatus of claim 4 wherein the hydraulic cylinder is connected between the conveyor means and the trough side wall.

6. The apparatus of claim 2 wherein the floor is pivotally attached to the bottom of the inlet.

7. The apparatus of claim 2 wherein the front wall has upper portion projecting away from the inlet.

8. The apparatus of claim 7 wherein the front wall has a lip projecting approximately parallel to the floor.

9. The apparatus of claim 2 wherein the inlet has inlet side walls and an inlet bottom wall, and wherein the trough floor is pivotally connected to the inlet bottom wall and the trough side walls are adjacent one another, and the trough side walls are capable of slidable movement relative to the inlet side walls.

10. The apparatus of claim 9 wherein the inlet bottom wall is curved.

11. An apparatus capable of receiving material from a delivery truck, the apparatus comprising:
chassis means capable of receiving material;
conveyor means mounted on the chassis means, the conveyor means having a discharge portion for discharging material into the chassis means and an inlet leading into the conveyor means; and
a trough extending from the inlet to receive material from the delivery truck;
wherein the trough is capable of having its volume decreased after receiving the material to move material in the truck dump hopper into the inlet;
further comprising a gate means connected to the conveyor means for partially restricting flow of paving material from the trough into the conveyor means.

12. The apparatus of claim 11 wherein the gate means is adjustable.

13. The apparatus of claim 11 wherein the trough is capable of holding material which defines an angle of repose, and wherein the material received from the delivery truck must flow between the gate means and the angle of repose in order to reach the conveyor means.

14. A self-propelled mobile apparatus for supplying asphalt-aggregate material from a delivery truck to a finishing machine comprising:
chassis means including ground engaging mobile support means and steering means for at least a part of the support means;
motive power means carried by chassis means and connected to at least a part of said support means;
hopper means mounted on said chassis means;
inclined conveyor means mounted on said chassis means and having a receiving portion adapted to receive the asphalt-aggregate material as it is discharged from the delivery truck, said conveyor means also having a delivery portion for discharging the asphalt-aggregate material into said hopper means; and
extendable trough means connected to the receiving portion of the conveyor means, the extendable trough means capable of holding asphalt-aggregate material and of reducing its volume to deliver material in the trough to the receiving portion of the conveyor means.

15. A self-propelled mobile apparatus for supplying asphalt-aggregate material from a delivery truck to a finishing machine comprising:
chassis means including ground engaging mobile support means and steering means for at least a part of the support means;
motive power means carried by chassis means and connected to at least a part of said support means;
conveyor means mounted on said chassis means and having a receiving portion adapted to receive the asphalt-aggregate material as it is discharged from the delivery truck, said conveyor means also having a delivery portion for discharging the asphalt-aggregate material into said chassis means; and
extendible trough means connected to the receiving portion of the conveyor means, the extendible trough means capable of holding asphalt-aggregate material and of reducing its volume to deliver material in the trough to the receiving portion of the conveyor means;
further comprising a gate means connected to the conveyor means to define a passage into the receiving portion of the conveyor means for partially restricting flow of paving material from the trough means into the conveyor means.

16. The apparatus of claim 15 wherein the gate means is adjustable.

17. A self-propelled mobile apparatus for supplying asphalt-aggregate material from a delivery truck to a finishing machine comprising:
chassis means including ground engaging mobile support means and steering means for at least a part of the support means;
motive power means carried by chassis means and connected to at least a part of said support means;
conveyor means mounted on said chassis means and having a receiving portion adapted to receive the asphalt-aggregate material as it is discharged from the delivery truck, said conveyor means also having a delivery portion for discharging the asphalt-aggregate material;
extendible trough means connected to the receiving portion of the conveyor means, the extendible trough means capable of holding asphalt-aggregate material and of reducing its volume to deliver material in the trough to the receiving portion of the conveyor means; and
gate means connected to the conveyor means for partially restricting flow of paving material from the trough means into the conveyor means;
wherein the trough means is capable of holding material which defines an angle of repose, and wherein the material received from the delivery truck must flow between the gate means and the angle of repose to reach the conveyor means.

18. The self-propelled mobile apparatus of claim 12 wherein the extendable trough means comprises a floor which has two longitudinal edges and two side edges, the floor being pivotally connected at one longitudinal edge to the inlet and being connected to the other longitudinal edge to a front wall, the trough means also having two side walls communicating between the side edges of the floor and the front wall.

19. The self-propelled mobile apparatus of claim 18 wherein the receiving portion comprises a curved bottom wall and side walls attached thereto, the trough side walls being adjacent to the receiving portion side walls, and the trough side walls capable of slidable movement relative to the receiving portion side walls.

20. The self-propelled mobile apparatus of claim 19 further comprising activating means communicating between the conveyor means and the trough means to move the floor about its pivotal connection to the receiving portion.

21. The self-propelled mobile apparatus of claim 20 wherein the floor is pivotally attached to the curved bottom wall of the receiving portion.

22. The self-propelled mobile apparatus of claim 20 wherein the actuating means is a hydraulic cylinder.

23. A method of transferring material from a truck to a self-propelled mobile apparatus which includes
   (i) a hopper means,
   (ii) a conveyor means having discharge end for discharging into the hopper means and receiving end for receiving the material from a truck, and
   (iii) an extendable trough attached to the receiving end of the conveyor means, the method comprising the steps of:
   extending the trough toward the truck to expand the trough holding capacity;
   discharging material from the truck into the trough; and
   retracting the trough to feed the material into the receiving end of the conveyor means.

24. The method of claim 23 further comprising the step of re-extending the trough after it is emptied of material.

25. The method of claim 23 wherein the trough is extended by pivoting it from a pivotal connection to the receiving end of the conveyor means.

26. The method of claim 23 wherein the material is discharged from a frameless truck.

27. The method of claim 23 wherein the self-propelled mobile apparatus further comprises:
   (iv) gate means attached to the conveyor means and projecting into the extendable trough, the method further comprising the step of limiting the feed of material into the receiving end of the conveyor means to material between the gate means and an angle of repose of material in the trough.

28. The method of claim 23 wherein the trough has a floor and the floor of the trough is retracted to at least the angle of repose.

29. A method of transferring material from a truck into a mobile apparatus which includes
   (i) a conveyor means having receiving end for receiving the material,
   (ii) a trough attached to the receiving end of the conveyor means, the trough having variable volume,
   (iii) gate means attached to the conveyor means to define a passage into the receiving end of the conveyor means, the method comprising the steps of:
   introducing material into the trough; and
   reducing the volume of the trough to feed material into the passage.

30. The method of claim 29 wherein the trough is pivotally attached to the conveyor means.

* * * * *